United States Patent [19]

Ardes

[11] Patent Number: 5,468,386
[45] Date of Patent: Nov. 21, 1995

[54] FILTER ASSEMBLY AND PREASSEMBLED DRAIN VALVE UNIT THEREFOR

[75] Inventor: Wilhelm Ardes, Ascheberg, Germany

[73] Assignee: Ing. Walter Hengst GmbH & Co. KG, Muenster, Germany

[21] Appl. No.: 212,945

[22] Filed: Mar. 15, 1994

[30] Foreign Application Priority Data

Mar. 19, 1993 [DE] Germany .............. 43 08 772.8

[51] Int. Cl.⁶ .................................................. B01D 35/14
[52] U.S. Cl. .................. 210/248; 210/428; 210/453
[58] Field of Search ................ 251/77, 322; 210/248, 210/435, 428, 453

[56] References Cited

U.S. PATENT DOCUMENTS

| | | | |
|---|---|---|---|
| 2,942,622 | 6/1960 | Hahn et al. | 251/77 |
| 4,906,365 | 3/1990 | Baumann et al. | 210/248 |
| 5,098,559 | 3/1992 | Mack et al. | 210/248 |

FOREIGN PATENT DOCUMENTS

4022723A1  4/1991  Germany.

*Primary Examiner*—Matthew O. Savage
*Attorney, Agent, or Firm*—Hill, Steadman & Simpson

[57] ABSTRACT

A filter and associated valve are provided which are particularly useful for the purification of oil or fuel in an internal combustion engine. The filter includes a preassembled valve unit having a sealing member, an activating member and an interposed spring element formed without a housing. The sealing member and activating member penetrate each other along a part of their axial length, guiding each other and being displaceable relative to each other in an axial direction. The relative axial displaceability is limited by a stopper provided at the activating member and/or the sealing member. The preassembled valve unit is guided axially moveable in a drain conduit of the filter after insertion of the valve unit into the conduit.

19 Claims, 4 Drawing Sheets

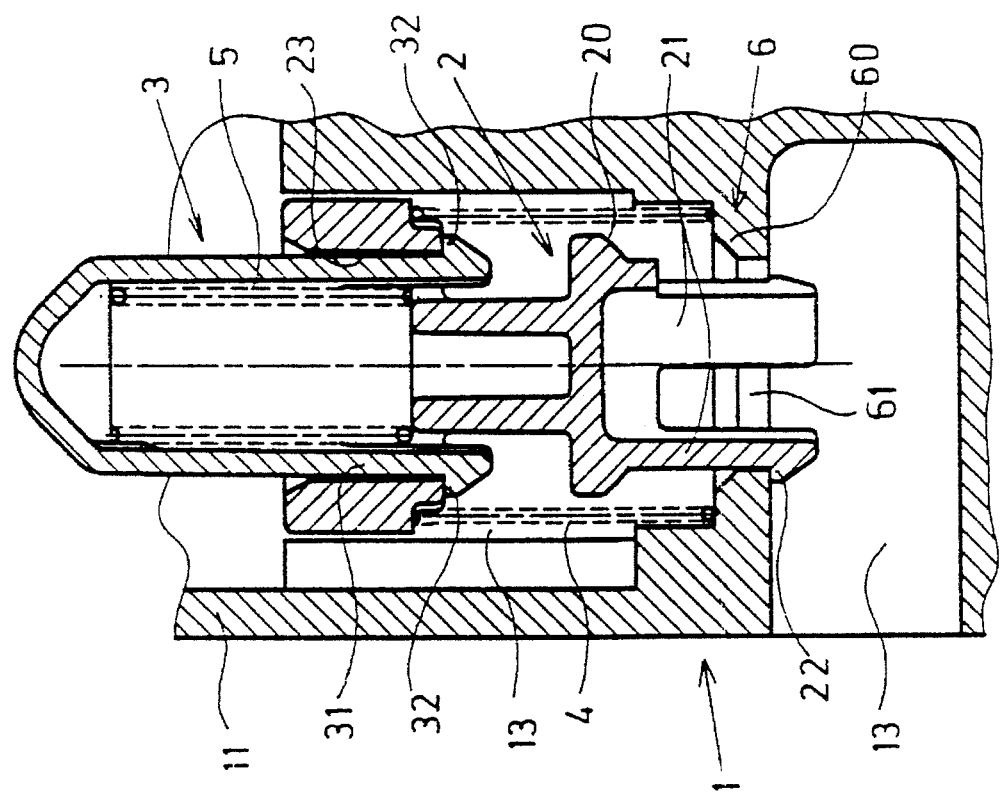
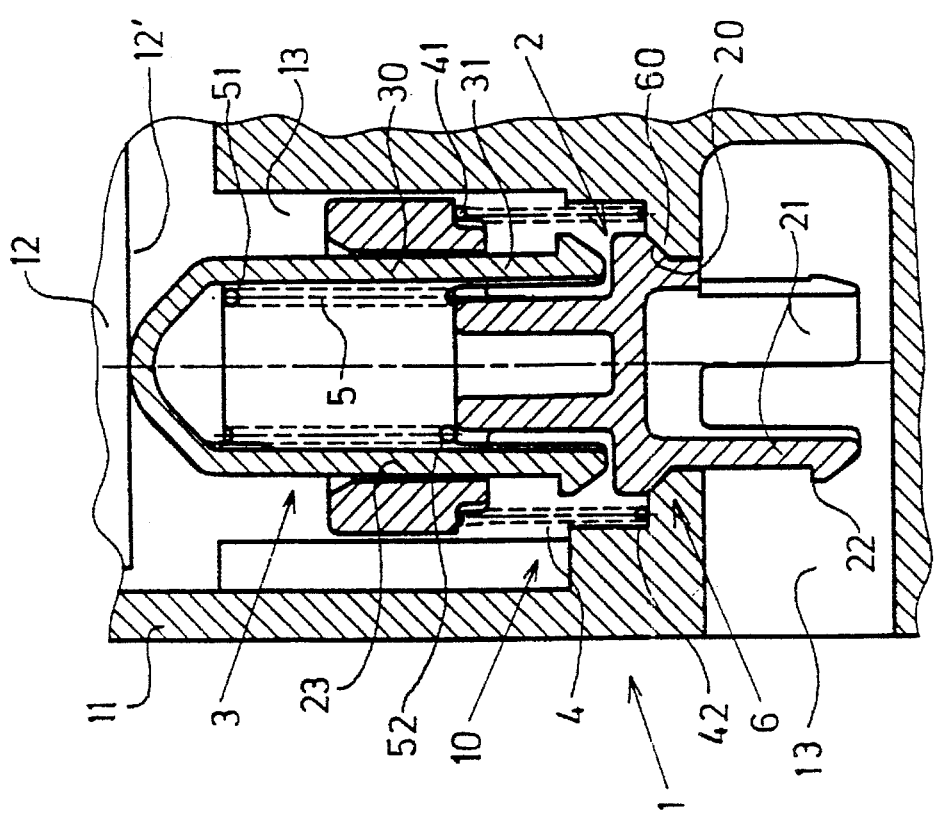
Fig. 3a
Fig. 3b

FILTER ASSEMBLY AND PREASSEMBLED DRAIN VALVE UNIT THEREFOR

BACKGROUND OF THE INVENTION

The present invention relates to a filter particularly for cleaning oil or fuel for an internal combustion engine. A typical filter of this type includes a filter housing, a replaceable filter cartridge, a supply conduit, a main drain conduit and a side drain conduit for draining the filter housing when removing the filter cartridge. A valve unit may be provided for such a filter with the valve maintained in a closed position by a lower front side of the filter cartridge when it is placed in the oil filter housing. A spring element is used to move the valve to an open position when the filter cartridge is removed. The valve comprises a sealing member, the first spring element biassing the sealing member in the opening direction, a seal seat, an activating member moveable relative to said sealing member in an axial direction, and a second spring element arranged between the sealing member and the activating member. The second spring member has a higher stiffness than the first spring element.

A filter of the kind mentioned is known from DE-40 22 723 A 1 wherein the disclosed filter is designed as a lube oil filter. With this known filter furthermore it is provided that the valve arranged in a side drain conduit is surrounded by a cylindrical valve housing, which preferably consists of an aluminum material, and is provided with a press fit area at the outer circumference thereof for pressing the valve housing into the side drain conduit. Furthermore it is proposed with this known filter that the activating member is guided at an inner area of the valve housing, and that the valve housing for limiting the axial movement of the activating member is comprised with a flanged edge at the upper end thereof. The spring constants of the two spring elements are harmonized with respect to each other such that firstly, the valve is held in closing position with the filter cartridge inserted, and that secondly, the valve is brought into the open position when taking the filter cartridge out of the filter housing, and that thirdly, with an erroneously lacking filter cartridge, the valve is brought into a closed position by oil pressure building up in the closed filter housing during operation of the associated internal combustion engine.

The known filter with the valve as described above comprises the required advantageous operation capacities, however, it is considered to be a disadvantage that for the manufacture of the valve a relatively high effort is required. This high effort particularly results from the fact that a dedicated valve housing is required which must manufactured for the valve, must be mounted with further parts of the valve and finally, must be finished, particularly comprised with a flanged edge.

SUMMARY OF THE INVENTION

Therefore it is an object to provide a filter, and valve therefore, of the kind mentioned above, which avoids the disadvantages mentioned and which particularly comprises a simpler construction while maintaining the advantageous operational capacities in the full extent thereof.

The object is attained according to the invention with a filter wherein the activating member and the sealing member penetrate each other along a part of their axial length, guide each other, and are displaceable relative to each other in axial direction. The relative axial displaceability is limited by stoppers provided at the activating member and/or at the sealing member. The preassembled unit is formed without a housing for the sealing member, the activating member and the second spring element which is interposed between the sealing member and the activating member. The preassembled valve unit is also guided axially movable in the side drain conduit after insertion of the valve unit into the side drain conduit.

With the filter according to the invention the activating member and the sealing member advantageously guide each other, whereby a dedicated valve housing is no longer necessary. In this manner, one of the construction parts previously required is no longer necessary, which simplifies the production and assembly of the valve and of the total filter and reduces the costs thereof.

Advantageous and preferred embodiments of the invention in view of the design of sealing member and activating member and their connection with each other and their mutual guiding are described in detail below.

The press fit required for the function of the valve is preferably formed either at the side of the filter housing in the side drain conduit, or as an alternative, as a ring element inserted in the side drain conduit and secured therein, wherein independent from each embodiment of the press fit, the latter comprises a round opening with an oblique sealing area at the top thereof, particularly in form of a part of a cone. With this embodiment of the sealing fit as a part of the filter housing, only a mechanically exact machining of the sealing area is necessary. When manufacturing the sealing fit as a separate ring element, the latter must be manufactured separately, however, in this case no exact mechanical machining of the filter housing is necessary. The ring element needs only a small height sufficient for the assembly thereof with the height being small compared with the height of the valve in total.

Preferably the ring element is a formed part made of metal or plastic, which can be pressed into the side drain conduit and secured by friction fit therein.

This offers the advantage that a preceding cutting surface working of the side drain conduit is not necessary and that the ring element can be inserted directly into the cast conduit. Smaller inaccuracies of the conduit's contour are compensated by the ring element with no leakage arising.

By using a ring element made of plastic, any contact corrosion is avoided which otherwise can occur, for example, in filter housings made of magnesium with inserted parts made of other metals and when the filter housings are in the presence of water, because, for example, fuel always contains a certain amount of water.

In a further embodiment of the invention it is provided that additionally, the first spring element is secured at the sealing member with the upper end thereof and forms a part of the pre-assembled unit. To this end, as an example, the sealing member may be provided with clamping or locking means engageable with the first spring element, that the first spring element is sufficiently secured at the pre-assembled unit, in order to insert the complete unit with the free end of the first spring element first into the side drain conduit and to secure it therein.

The spring elements mentioned above preferably are helical springs as such springs may be manufactured simply and cheaply with the required spring constant maintained with sufficient accuracy.

A further contribution to a particularly inexpensive manufacture of the valve is attained in that the sealing member and the activating member preferably are plastic parts produced by injection molding.

The filter housing advantageously is a light metal diecast part, preferably made of aluminum or magnesium or their alloys, whereby the manufacturing becomes easy and the weight of the filter housing becomes low.

BRIEF DESCRIPTION OF THE DRAWINGS

Embodiments of the invention are explained in the following with reference to a drawing. The figures of the drawing illustrate.

FIG. 3a is a partial sectional view of a filter with a valve in a first embodiment, in a closed position.

FIG. 3b is a partial sectional view of the valve according to FIG. 3a in an open position.

DETAILED DESCRIPTION OF THE PREFERRED EMBODIMENTS

Figure 1:
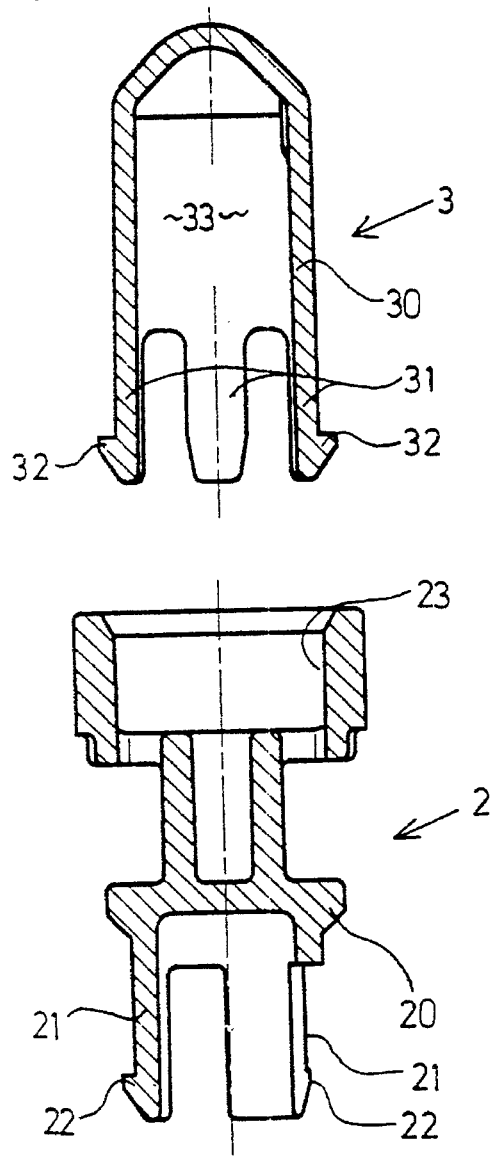
FIG. 1 is an exploded sectional view of a sealing member and an activating member as parts of a valve for a filter.

FIG. I of the drawing illustrates two essential parts of the valve in longitudinal section before the assembly thereof, namely a sealing member 2 and an activating member 3.

The sealing member 2 consists of a central part with an oblique, conical and perhaps additionally, slightly crowned sealing area 20, wherein several resilient arms 21 extend downwards from this central part and an angular guide 23 is joined extending upwards. The arms 21, three in this case, are arranged concentrically in relation to the central longitudinal axis of the sealing member 2 and extend downwards in axial direction. Each arm 21 comprises at the free lower end thereof, a snap-in lug 22 protruding radially outwards and comprising a barb contour. The guide 23 forming the upper part of the sealing member 2 is designed as a ring with a hollow interior and is produced integrally with the remaining part of the sealing member 2.

The activating member 3 comprises a hollow cylindrical base member 30, which at the top end thereof is defined by a dome-shaped end integral with the base member 30. In total four resilient arms 31 extend downwards from the base member 30 with the arms extending also concentrically to the central longitudinally axis of the activating member 3 in the axial direction thereof. At the free end thereof each arm 31 comprises a snap-in lug 32 protruding radially outwards and comprising a barb contour.

Figure 2:
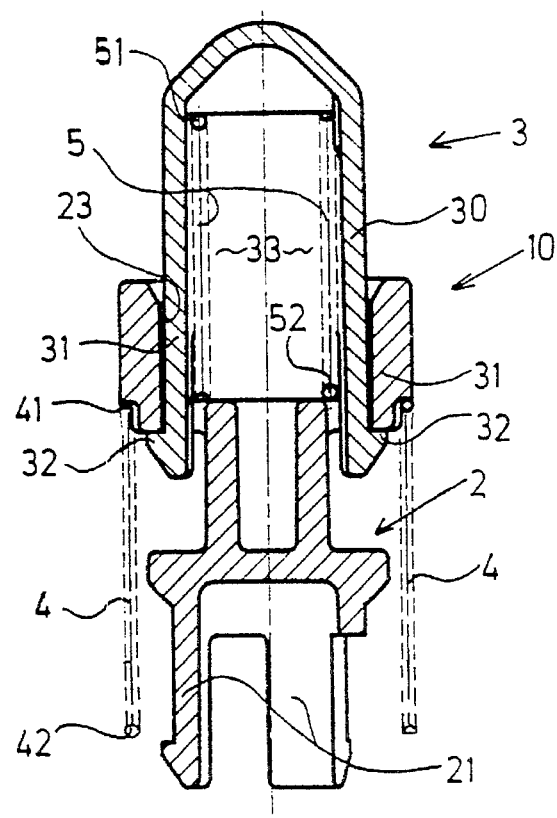
FIG. 2 is a sectional view of the sealing member and the activating member together with two spring elements in a pre-assembled unit.

FIG. 2 of the drawing illustrates a pre-assembled unit 10 assembled of the two parts described before, namely the sealing member 2 and the activating member 3, and two spring elements 4 and 5, helical springs in this case.

For this reason the activating member 3 is inserted into the angular guide 23 from the top with the arms 31 first until the snap-in lugs 32 protrude through the guide 23 and are sprung back outwards. The outer diameter of the activating member 3 and the inner diameter of the guide 23 correspond with each other such, that sufficient room for sliding movement there between is present.

Between the sealing member 2 and the activating member 3 the helical spring 5 is arranged with an upper end 51 thereof supported at the activating member 3 and a lower end 52 supported at the sealing member 2. The spring 5 is arranged within a hollow interior 33 of the base member 30 of the activating member 3. The activating member 3 is engaged by the spring 5 with an outwards directed force directed upwards in relation to the sealing member 2. The axial displaceability of the activating member 3 is limited upwards towards an axial direction of lesser penetration by the outward protruding barb-like contour of the stopper means or snap in lugs 32 forming a stop for the axial displaceability in cooperation with the underside of the angular guide 23 of the sealing member 2.

Furthermore the pre-assembled unit 10 according to FIG. 2 comprises the helical spring 4 secured with an upper end 41 thereof to an outer side of the angular guide 23 by a clamping action. A lower end of the helical spring 42 is unsecured and is positioned at about the height of the lower end of the arm 21 of the sealing member 2.

It is clear that the pre-assembled unit 10 described above only consists of four simple construction members 2, 3, 4 and 5, which may be assembled without complication by simple composition to form the pre-assembled unit 10. This composition may also be accomplished automatically without any problems. A finish of the individual parts of the pre-assembled unit 10 is not necessary.

FIGS. 3a and 3b of the drawing illustrate a first embodiment of the complete valve 1 in its mounting condition in a side drain conduit 13 within a filter housing 11 with the valve 1 comprised by the pre-assembled unit 10 described above with reference to FIG. 2 and by a sealing fit or valve seat 6 provided at the side of the filter housing.

In FIG. 3a the valve is illustrated in the closed position thereof wherein this closed position is attained by a filter cartridge 12 inserted into the filter housing 11 with a lower front area 12' of the filter cartridge 12 pressing on the activating member 3 from the top. The helical spring 5 exerts a downward directed force onto the sealing member 2 with the force pressing the sealing member with the sealing area 20 thereof sealingly onto a sealing area 60 of the sealing fit 6. The spring 5 serves as a compensation spring between the activating member 3 and the sealing member 2 in order to compensate for inaccuracies between the filter housing 11 and the filter cartridge 12 inserted therein. The further helical spring 4 in this condition of the valve 1 is also compressed. The spiral spring 4 with the lower end thereof is supported on a step-like part of the filter housing 11, for example, formed in the wall of the side drain conduit 13, surrounding the sealing fit 6.

The arms 21 at the lower part of the sealing member 2 are arranged below the sealing fit 6. The arm 21 get into this position by inserting the pre-assembled unit 10 from the top into the side drain conduit 13 with the arms 21 resiliently and flexibly being pushed through the sealing fit 6. After the passage the stopper means or snap-in lugs 22 at the lower end of the arms 21 will spring back, whereby on the one hand an axial sliding guide of the sealing member 2 within the sealing fit 6, and on the other hand a limitation of the axial displaceability of the sealing member 2 upwards towards an axial direction of lesser penetration in relation to the filter housing 11, is attained.

Furthermore FIG. 3a illustrates that in the upper part of the valve 1 in the area of the angular guide 23 of the sealing member 2, the angular guide 23 is guided at the outer side, wherein the width of the side drain conduit 13 is selected such that the outer circumference of the angular guide 23 comprises sufficient room for free axial movement in relation to the dimensions of the side drain conduit 13.

Regarding the further numerals shown in FIG. 3a, reference is made to the preceding description referring to FIGS. 1 and 2.

FIG. 3b illustrates the valve 1 according to FIG. 3a in the open position thereof. This open position is attained in that the filter cartridge 12 is taken out of the filter housing 11 upwards. When this .occurs, the springs 4 and 5 may expand, whereby on the one side the activating member 3, in relation to the sealing member 2, is moved upwards to the stop of the snap-in lugs 32 at the lower side of the angular guide 23, and whereby on the other side the sealing member 2, together with the activating member 3, is raised upwards by the spring 4 until the snap-in lugs 22 at the arms 21 of the sealing member 2 contact the underside of the sealing fit 6 forming a stop against further movability of the sealing member away from the seat. In this condition, the side drain conduit 13 is open such, that liquid, for example oil, from the interior of the filter housing 11 may flow through the side drain conduit 13, e.g., to the oil sump of an associated internal combustion engine. In the area of the sealing fit 6 the oil flows through an opening 61.

The position of the valve 1 illustrated in FIG. 3b is present when the filter cartridge 12 is taken out of the filter housing 11 and there is no positive pressure differential in the interior of the filter housing 11 versus the lower part of the side drain conduit 13, or, respectively, versus, e.g., the oil sump of an associated internal combustion engine. In case inadvertently no filter cartridge 12 is inserted into the filter housing 11, e.g., an oil supply of the associated internal combustion engine is attained, wherein for this reason the oil pressure is used which exists in the interior of the closed oil filter housing 11. This oil pressure, which exists with a running internal combustion engine, provides that the sealing member 2 is moved downwards into the closed position thereof against the force of the spring 4 with the activating member 3 remaining in the raised position thereof relative to the sealing member 2. Hereby it is assured that the internal combustion engine is supplied with lube oil, however, in an unfiltered condition.

Figure 4A:
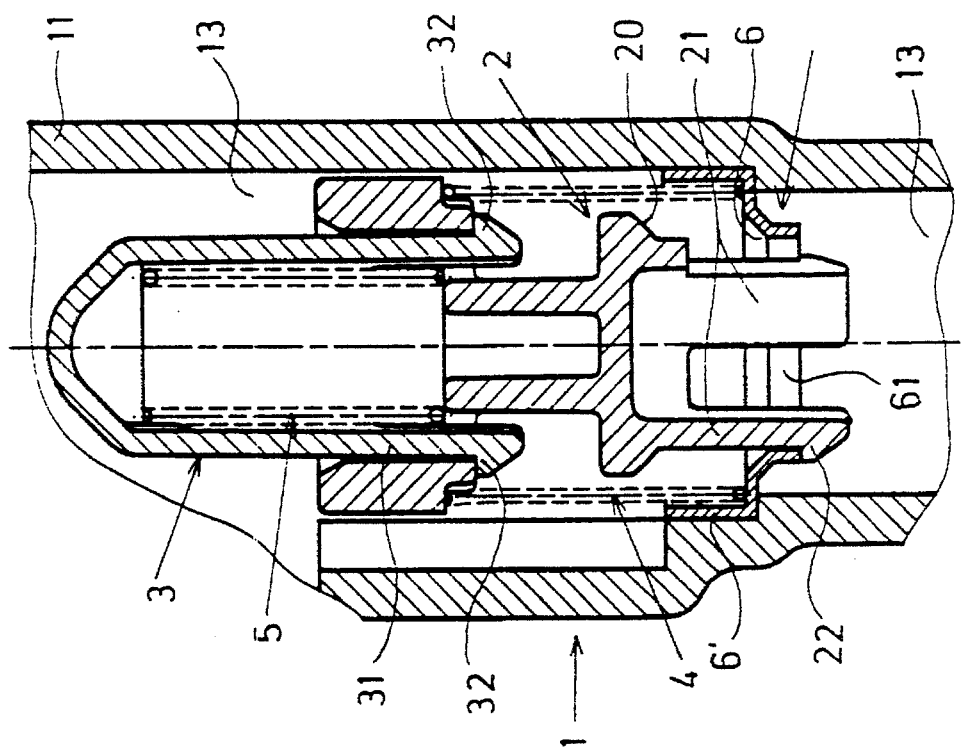
FIG. 4a is a partial sectional view of a filter with .a valve in a second embodiment, in a closed position.
Figure 4B:
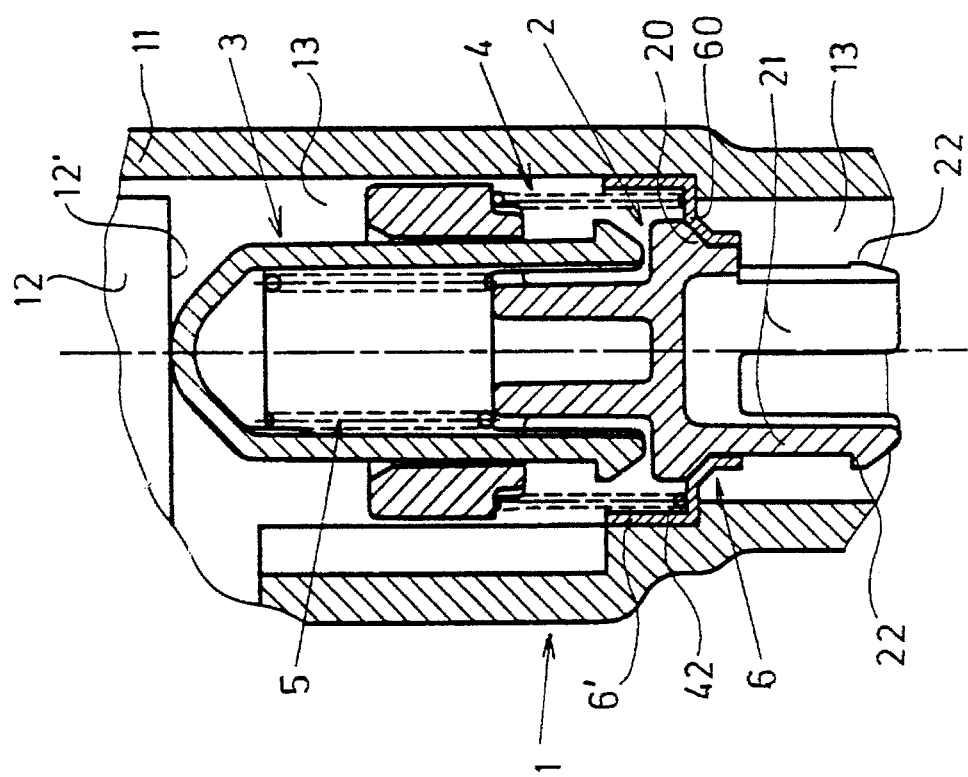
FIG. 4b is a partial sectional view of the valve according to FIG. 4a in an open position.

FIGS. 4a and 4b of the drawing illustrate a second embodiment of the valve 1 also in an assembled condition in the side drain conduit 13 within the filter housing 11. The essential difference with respect to the embodiment of FIGS. 3a and 3b is that the sealing fit 6 is not provided at the side of the filter housing, but as a separate ring element 6' assembled in the side drain conduit 13. The ring element 6' comprises a flat cylindrical circumferential area concentric with the longitudinal axis of the side drain conduit 13, with the ring element 6' pressed into the side drain conduit 13 with a friction fit by means of the circumferential area. The depth of the pressing therein is defined by a step in the side drain conduit 13. The ring element 6' of the sealing fit 6 comprises at the radial inner side thereof an oblique conical sealing area 60 corresponding with the contour of the sealing area provided at the housing and described with reference to FIGS. 3a and 3b.

In FIG. 4a the valve 1 is illustrated in the closed position thereof, which also in this case is attained by a filter cartridge 12 inserted into the filter housing 11 with the lower front area 12' thereof pressing the activating member 3 downwards and securing it in this position. Also in this case the sealing member 2 is pressed downwards by the spring 5 such that the sealing area 20 thereof sealingly engages the sealing area 60 of the sealing fit 6. Also the spring 4 is compressed. In order to maintain the sealing fit 6 in the sealing position thereof, when a filter cartridge 12 is present within the filter housing 11, the spring 5 is designed stronger than the spring 4, which means that it comprises a higher spring constant. The weaker spring 4 is not in a condition to lift the sealing member 2 from the sealing fit 6 as long as the activating member 3 is pressed downwards.

FIG. 4b of the drawing shows the valve 1 of FIG, 4a in the open position thereof wherein this is attained in that the filter cartridge 12 is taken out of the filter housing 11. Thereby the downward directed force is no longer present, with the force engaging the activating member 3 from the top, whereby the springs 5 and 4 will expand again and lift the activating member 3 and the sealing member 2 upwards.

The limitation of the axial displaceability of the activating member 3 in upward direction is attained by the snap-in lugs 32 in the way described before, the axial displaceability of the sealing member 2 in upward direction is limited by the snap-in lugs 22 at the arms, with the snap-in lugs 22 co-operating with the lower end of the ring element 6'.

With this embodiment for the mounting of the valve 1 into the side drain conduit 13, preferably the preassembled unit 10 consisting of the sealing member 2, the ring element 6', the activating member 3, and the two springs 4 and 5 is inserted and pressed downwards into the side drain conduit from the top with a suitable tool until the ring element 6' is pressed into its full press-in depth.

Also in this case the spring constants of the two springs 4 and 5 are harmonized such that when a filter cartridge is missing from the filter housing 11, the oil pressure present in a associated running internal combustion engine will bring the sealing member 2 into its closing position against the force of the weaker spring 4.

Figure 5:
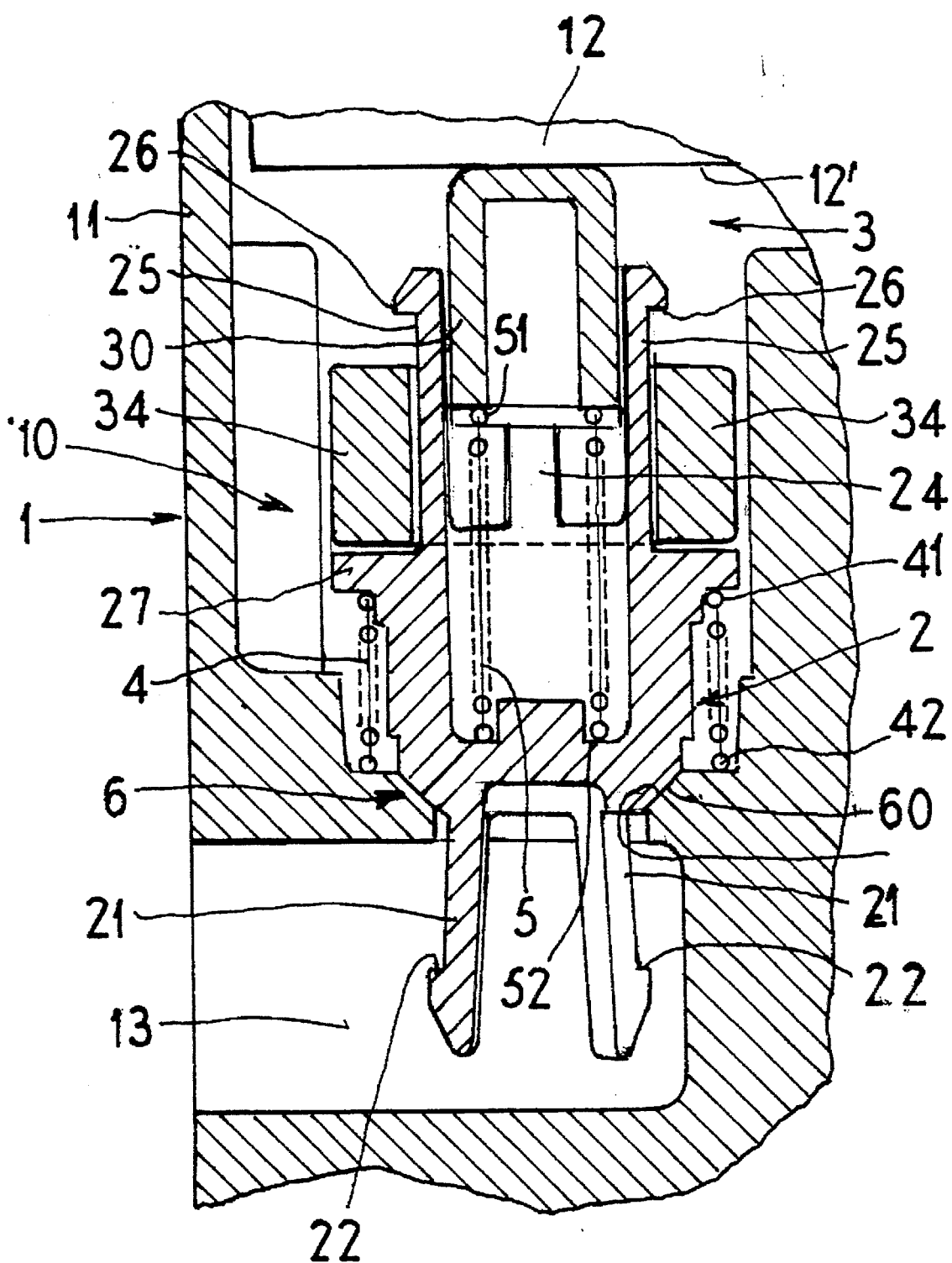
FIG. 5 is a partial sectional view of a filter with a valve in a third embodiment, in a closed position.

The third embodiment of the valve 1 shown in FIG. 5 also comprises a sealing member 2 and an activating member 3, guiding each other and being displaceable relative to each other in axial direction.

The sealing member 2 consists of a central part having an essentially cylindrical form and with a conical sealing area 20 at its lower end. Three resilient arms 21 are protruding downwards from the sealing area 20, each of the arms 21 comprising a radially outwards protruding snap-in lug 22 with a barb contour at its free end.

Upwards, the central part of the sealing member 2 passes over to an upper body part 24, which is formed by, in this embodiment, four resilient arms 25, protruding upwards and each of them comprising at its free end a radially outwardly protruding snap-in lug 26 with: a barb contour.

The activating member 3 comprises a base member 30 and a ring-shaped guide 34, with the base member 30 and the guide 34 being made in one piece. For the most part, the base member 30 is arranged within the space being defined by the four arms 25 of the sealing member 2, with the ring-shaped guide 34 surrounding an outside of the arms 25. The activating member 3 and the sealing member 2 are connected with each other by inserting the arms 25 with the snap-in lugs 26 ahead into the activating member 3 between the base member 30 and the guide 34, until the snap-in lugs 26 are sprung out again. The snap-in lugs then make sure that the axial displaceability of activating member 3 and sealing member 2 relative to each other is limited.

Between the activating member 3 and the sealing member 2 again the helical spring 5 is arranged, with its upper end 51 resting on the activating member 3 beneath the base member 30 and with its lower end 52 resting on the upper side of the central part of the sealing member 2.

Further, FIG. 5 shows the helical spring 4, too, surrounding an outside of the sealing member 2 and resting with its lower end 42 on a step in the filter housing 11 and with its upper end 41 on a radially outwards protruding collar 27 of the sealing member 2.

The sealing fit 6 in this embodiment according to FIG. 5 is again designed as a part of the filter housing 11. Thus in this embodiment the pre-assembled unit 10 comprises the sealing member 2, the activating member 3 and the two helical springs 4, 5. For mounting this pre-assembled unit 10 into the filter housing 11, the unit 10 is moved from above towards the sealing fit 6 until the arms 21 with their snap-in lugs 22 have moved through the sealing fit 6 and are sprung back. The displaceability of the sealing member 2 in an upward direction thereafter is limited by the snap-in lugs 22.

In FIG. 5 the valve 1 is shown in its closed position, which is caused by the filter cartridge 12 inserted into the filter housing 11, with the underside 12' of the filter cartridge 12 depressing the activating member 3.

When the filter cartridge 12 is removed upwardly from the filter housing 11, the activating member 3 and the sealing member 2 are moved upwards by the relaxing helical springs 4, 5, whereby the valve 1 moves into its open position and whereby a fluid connection from the interior of the filter housing 11 into the side drain conduit 13 is provided.

As it is obvious from all figures in the drawing the valve 1 described herein needs no own valve housing which diminishes the number of the construction members to be assembled and reduces the production, assembly, and mounting costs.

As is apparent from the foregoing .specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A filter comprising:

a filter housing;

a replaceable filter cartridge;

a side drain conduit extending along an axis for draining said filter housing upon removal of said filter cartridge;

a seal seat in said side drain conduit;

a preassembled valve unit comprising a sealing member and an activating member, said sealing member engageable with said seal seat, said valve unit being mounted in said side drain conduit so as to project said activating member into an area occupied by said filter cartridge;

a first spring element biassing said sealing member in a direction away from said seal seat;

said sealing member maintained in a closed position relative to said seal seat upon engagement of said activating member of said valve unit by said filter cartridge when said filter cartridge is inserted into said housing, and said sealing member being moveable along said axis relative to said seal seat into an open position by said first spring element upon a removal of said filter cartridge;

a second spring element forming a part of said preassembled valve unit and being arranged between said sealing member and said activating member;

said second spring element having a higher stiffness than said first spring element;

said activating member and said sealing member penetrating each other along a part of their axial length and guiding each other and being axially displaceable relative to each other along said axis to effect greater and lesser axial penetration;

an extent of said activating member and said sealing member being displaceable relative to one another in an axial direction of lesser penetration being limited by stopper means provided at at least one of said activating member and said sealing member;

said preassembled valve unit being formed of said sealing member, said activating member and said second spring element being held together by said stopper means without a separate housing; and said preassembled valve unit having a wall portion sized relative to said side drain conduit so as to axially guide said preassembled valve unit as it moves in said side drain conduit after insertion of said valve unit into said side drain conduit.

2. A filter according to claim 1, wherein said sealing member comprises a sealing area and guide means for guiding said sealing member in said side drain conduit, said activating member extending into said sealing member at said guide means, said activating member being provided with said stopper means for stopping axial movement thereof, said stopper means being resiliently pressable through said guide means during insertion of said activation member into said guide means, and said stopper means forming a stop engageable with said guide means to limit displacement in said axial direction of lesser penetration of said activating member relative to said sealing member after said stopper means has been pressed through said guide means.

3. A filter according to claim 2, wherein said guide means comprises a ring integrally formed with said sealing member and said stopper means comprises a plurality of axially extending arms, each arm having a lug protruding radially outwards, said lugs being resiliently and flexibly pressable through said ring of said guide means and forming said stop.

4. A filter according to claim 1, wherein said activating member comprises guiding means for guiding said activating member in said side drain conduit, said sealing member having a part extending into said activating member at said guiding means, said sealing member part being provided with said stopper means for stopping axial movement thereof, said stopper means being resiliently pressable through said guiding means during insertion of said sealing member into said guiding means, and said stopper means forming a stop engageable with said guide means to limit displacement in said axial direction of lesser penetration of said sealing member relative to said activating member after said stopper means has been pressed through said guiding means.

5. A filter according to claim 4, wherein said guiding means comprises a ring integrally formed with said activating member and said stopper means comprises a plurality of axially extending arms, each arm having a snap-in lug protruding radially outwards, said snap-in lugs being resiliently and flexibly pressable through said guide means and forming said stop.

6. A filter according to claim 1, wherein said sealing member comprises a sealing area and a plurality of axially extending arms, each arm having a lug protruding radially outwards, said lugs being resiliently and flexibly pressable through an opening of said seal seat and forming a stop against further movability of said sealing member away from said seal seat.

7. A filter according to claim 1, wherein said seal seat is formed in said side drain conduit as a round opening with an oblique sealing area.

8. A filter according to claim 1, wherein said seal seat is formed as a ring element inserted in said side drain conduit and secured therein, with said ring element comprising a round opening with an oblique sealing area.

9. A filter according to claim 8, wherein said ring element is formed of metal and is pressed into said side drain conduit and secured by friction fit therein.

10. A filter according to claim 8, wherein said ring element is formed of plastic and is pressed into said side drain conduit and secured by friction fit therein.

11. A filter according to claim 8, wherein said ring element forms a part of said preassembled valve unit.

12. A filter according to claim 1, wherein said first spring element is secured with a first end thereof at said sealing member and forms a part of said preassembled valve unit.

13. A filter according to claim 1, wherein said first and second spring elements are helical springs.

14. A filter according to claim 1, wherein said sealing member and said activating member are plastic parts made by injection molding.

15. A filter according to claim 1, wherein said filter housing is a light metal die cast part made from the group consisting of aluminum, magnesium, and their alloys.

16. A valve for use in a filter housing drain conduit with a seal seat therein, said valve comprising:

a sealing member adapted to engage with said seal seat;

an activating member, said activating member and said sealing member penetrating each other along a part of their axial length and guiding each other and being displaceable relative to each other to effect greater and lesser axial penetration;

stopper means provided at at least one of said activating member and said sealing member to limit relative displaceability between said activating member and said sealing member in an axial direction of lesser penetration;

a first spring element engaged with said sealing member;

a second spring element arranged between said sealing member and said activation member;

said second spring element having a higher stiffness than said first spring element;

guide means formed on said valve to permit said valve to be guided axially moveable in said drain conduit after insertion of said valve into said drain conduit; wherein said stopper means holds said activating member, said sealing member, and said second spring element together as a preassembled unit without a separate housing.

17. A valve according to claim 16, wherein said first spring element is secured with a first end thereof at said sealing member and forms a part of said preassembled valve unit.

18. A valve unit for use in a filter housing drain conduit, said valve unit comprising:

a ring element having an opening and a seal seat surrounding said opening;

a sealing member having a seal area for engaging with said seal seat;

said sealing member having a portion penetrating beyond said seal seat and through said opening, said seal seat and said sealing member being displaceable relative to each other to effect greater and lesser axial penetration;

stopper means provided at said portion of the sealing member to limit relative displaceability between said seal seat and said sealing member in an axial direction of lesser penetration;

an activating member, said activating member and said sealing member penetrating each other along a part of their axial length and guiding each other and being displaceable relative to each other to effect greater and lesser penetration;

stopper means provided at activating member to limit relative displaceability between said activating member and said sealing member in an axial direction of lesser penetration;

a first spring element engaged with said sealing member; and a second spring element arranged between said sealing member and said activation member;

said second spring element having a higher stiffness than said first spring element.

19. A valve according to claim 18, wherein said stopper means holds said activating member, sealing member and second spring element as a unit without a separate housing.

* * * * *